United States Patent
Qing et al.

(10) Patent No.: US 8,565,434 B2
(45) Date of Patent: Oct. 22, 2013

(54) METHODS AND SYSTEMS FOR MAINTAINING SECURITY KEYS FOR WIRELESS COMMUNICATION

(75) Inventors: Shan Qing, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1116 days.

(21) Appl. No.: 12/127,377

(22) Filed: May 27, 2008

(65) Prior Publication Data

US 2009/0296934 A1   Dec. 3, 2009

(51) Int. Cl.
*H04L 9/00* (2006.01)

(52) U.S. Cl.
USPC ........... 380/277; 380/247; 380/258; 380/259; 380/270; 713/180; 713/190; 726/23

(58) Field of Classification Search
USPC ................. 380/277, 248, 270, 247, 258, 259; 726/23; 713/188, 190; 455/411; 709/230; 370/338
See application file for complete search history.

(56) References Cited

U.S. PATENT DOCUMENTS

| | | | |
|---|---|---|---|
| 6,587,680 B1 * | 7/2003 | Ala-Laurila et al. | 455/411 |
| 7,123,719 B2 * | 10/2006 | Sowa et al. | 380/247 |
| 7,882,255 B2 * | 2/2011 | Sood et al. | 709/230 |
| 2004/0117623 A1 * | 6/2004 | Kalogridis et al. | 713/165 |
| 2007/0005972 A1 | 1/2007 | Mizikovsky et al. | |
| 2008/0080713 A1 | 4/2008 | Cho et al. | |

FOREIGN PATENT DOCUMENTS

| | | |
|---|---|---|
| JP | 2005260987 A | 9/2005 |
| JP | 2006060336 A | 3/2006 |
| JP | 2008048018 A | 2/2008 |
| WO | 2005086412 A1 | 9/2005 |
| WO | 2008001726 A1 | 1/2008 |
| WO | 2009136981 A1 | 11/2009 |

OTHER PUBLICATIONS

International Search Report PCT/US09/044571, International Search Authority, European Patent Office [Mar. 12, 2010].
Written Opinion—PCT/US2009/044571—ISA/EPO—Mar. 12, 2010.
Taiwan Search Report—TW098116890—TIPO—Jun. 25, 2012.

* cited by examiner

*Primary Examiner* — Thanhnga B Truong
(74) *Attorney, Agent, or Firm* — Charles Chesney

(57) ABSTRACT

Certain embodiments allow security keys to be maintained across mobile device states, or communication events, such as hand-over, and system idle and sleep power savings modes. By monitoring the lifetime of security keys, keys may be refreshed in an effort to ensure key lifetimes will not expire during a hand-over process or other device unavailable state.

20 Claims, 11 Drawing Sheets

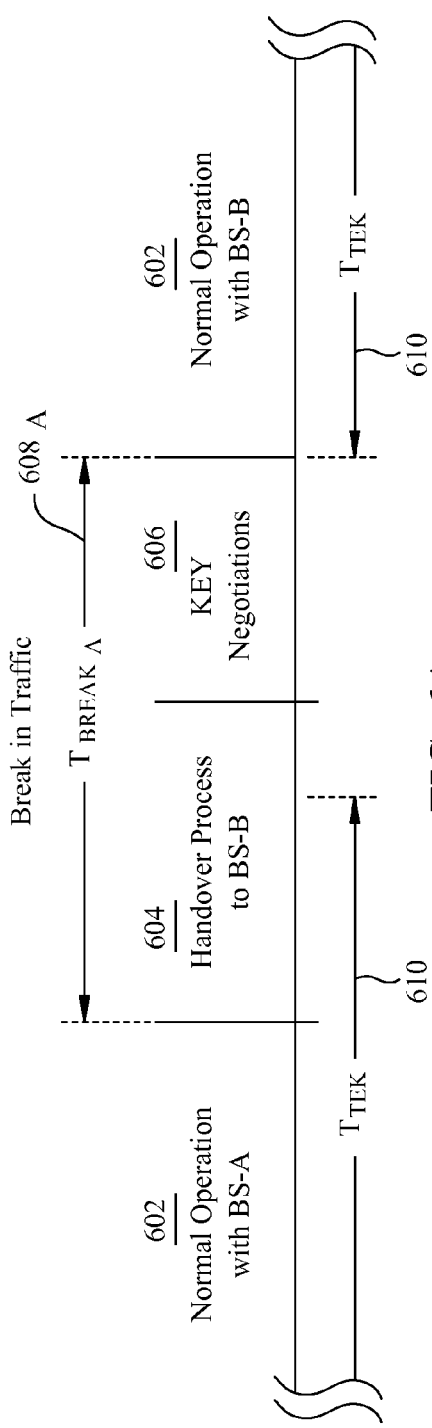
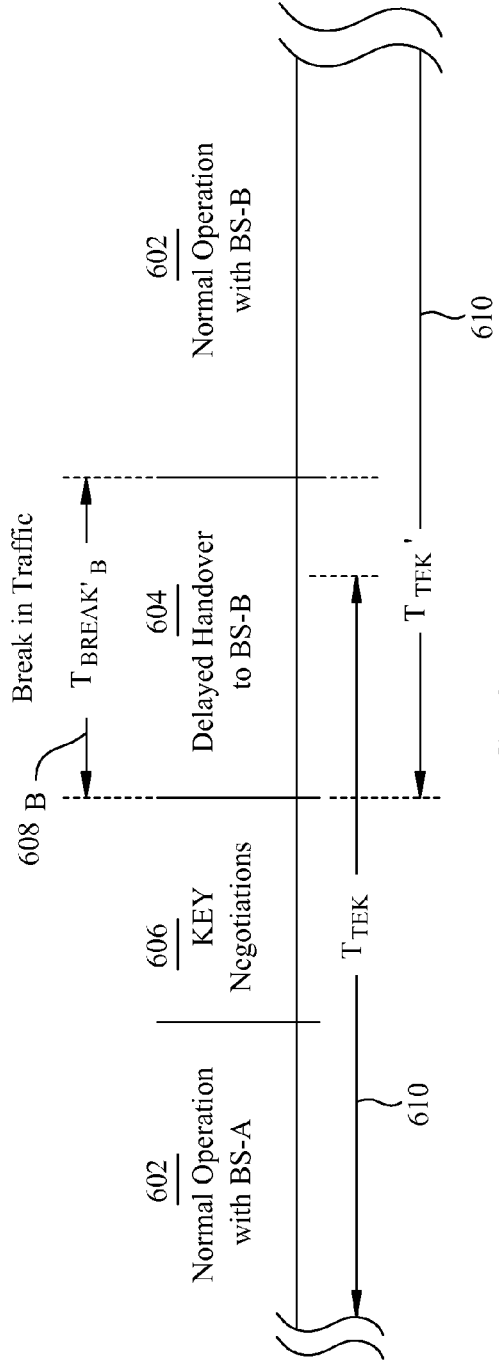
FIG. 6A
FIG. 6B

METHODS AND SYSTEMS FOR MAINTAINING SECURITY KEYS FOR WIRELESS COMMUNICATION

TECHNICAL FIELD

Certain embodiments of the present disclosure generally relate to wireless communication and, more particularly, to maintaining security keys for wireless communication, such as across mobile states in a wireless device.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

In such systems, a security protocol often requires the network and mobile station share valid security keys such as AK (authorization key) and TEK (traffic encryption key) keys. These security keys are used for both management connections, as well as transport connections. Different security keys have different lifetimes and the standard requires the network and mobile station to refresh the keys periodically, depending on the length of their lifetimes. In the event that a security key lifetime expires before the key is refreshed, communication between mobile station and the network will be halted until new security key is successfully negotiated.

Unfortunately, negotiating a new key may be a relatively lengthy process that detracts from the user experience. In the event that a security key lifetime expires during a hand-over between base stations, communication between the mobile station and the new base station will be delayed until a new security key is successfully negotiated, thus adding to any break in traffic caused by the hand-over.

SUMMARY

Techniques presented herein allow for security keys to be maintained across various mobile system states, or communication events, such as hand-over, idle, and sleep modes.

Certain embodiments present methods for maintaining one or more security keys used by a wireless device for wireless communication, including one or any combination of: determining when a communication event should occur; monitoring the lifetime of the one or more security keys to identify whether at least one security key is likely to expire during the communication event; delaying the communication event if the at least one security key is identified as likely to expire; and refreshing the at least one security key identified as likely to expire. In certain embodiments, the methods can include repeating the steps of determining, monitoring, delaying, and refreshing until no security key is identified as likely to expire and initiating the communication event. In certain embodiments, the communication event can include a hand-over event, a power savings mode, a sleep mode, or an idle mode. In certain embodiments, the methods can include communicating using frames in accordance with one or more standards of the Institute of Electrical and Electronics Engineers (IEEE) 802.16 family of standards.

Certain embodiments present apparatuses configured to maintain one or more security keys used by a wireless device for wireless communication, including one or any combination of: logic for determining when a communication event should occur; logic for monitoring the lifetime of the one or more security keys to identify whether at least one security key is likely to expire during the communication event; logic for delaying the communication event if the at least one security key is identified as likely to expire; and logic for refreshing the at least one security key identified as likely to expire. In certain embodiments, the apparatuses can include logic for repeating the logic for determining, logic for monitoring, logic for delaying, and logic for refreshing until no security key is identified as likely to expire, and logic for initiating the communication event. In certain embodiments, the communication event can include a hand-over event, a power savings mode, a sleep mode, or an idle mode. In certain embodiments, the apparatuses can include logic for communicating using frames in accordance with one or more standards of the Institute of Electrical and Electronics Engineers (IEEE) 802.16 family of standards.

Certain embodiments present apparatuses for maintaining one or more security keys used by a wireless device for wireless communication, including one or any combination of: means for determining when a communication event should occur; means for monitoring the lifetime of the one or more security keys to identify whether at least one security key is likely to expire during the communication event; means for delaying the communication event if the at least one security key is identified as likely to expire; and means for refreshing the at least one security key identified as likely to expire. In certain embodiments, the apparatuses can include means for repeating the means for determining, means for monitoring, means for delaying, and means for refreshing until no security key is identified as likely to expire, and means for initiating the communication event. In certain embodiments, the communication event can include a hand-over event, a power savings mode, a sleep mode, or an idle mode. In certain embodiments, the apparatuses can include means for communicating using frames in accordance with one or more standards of the Institute of Electrical and Electronics Engineers (IEEE) 802.16 family of standards.

Certain embodiments present computer-program products for maintaining one or more security keys used by a wireless device for wireless communication comprising a computer readable medium having a set of instructions stored thereon, the set of instructions being executable by one or more processors and the set of instructions including one or any combination of: instructions for determining when a communication event should occur; instructions for monitoring the lifetime of the one or more security keys to identify whether at least one security key is likely to expire during the communication event; instructions for delaying the communication event if the at least one security key is identified as likely to expire; and instructions for refreshing the at least one security key identified as likely to expire. In certain embodiments, the set of instructions can include instructions for repeating the instructions for determining, instructions for monitoring, instructions for delaying, and instructions for refreshing until no security key is identified as likely to expire, and instructions for initiating the communication event. In certain embodiments, the communication event can include a hand-over event, a power savings mode, a sleep mode, or an idle mode. In certain embodiments, the set of instructions can include instructions for communicating using frames in accordance with one or more standards of the Institute of Electrical and Electronics Engineers (IEEE) 802.16 family of standards.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 6A & 6B illustrate example breaks in timing during a normal hand-over and a delayed hand-over, respectively, in accordance with embodiments of the present disclosure.

DETAILED DESCRIPTION

Figure 1:
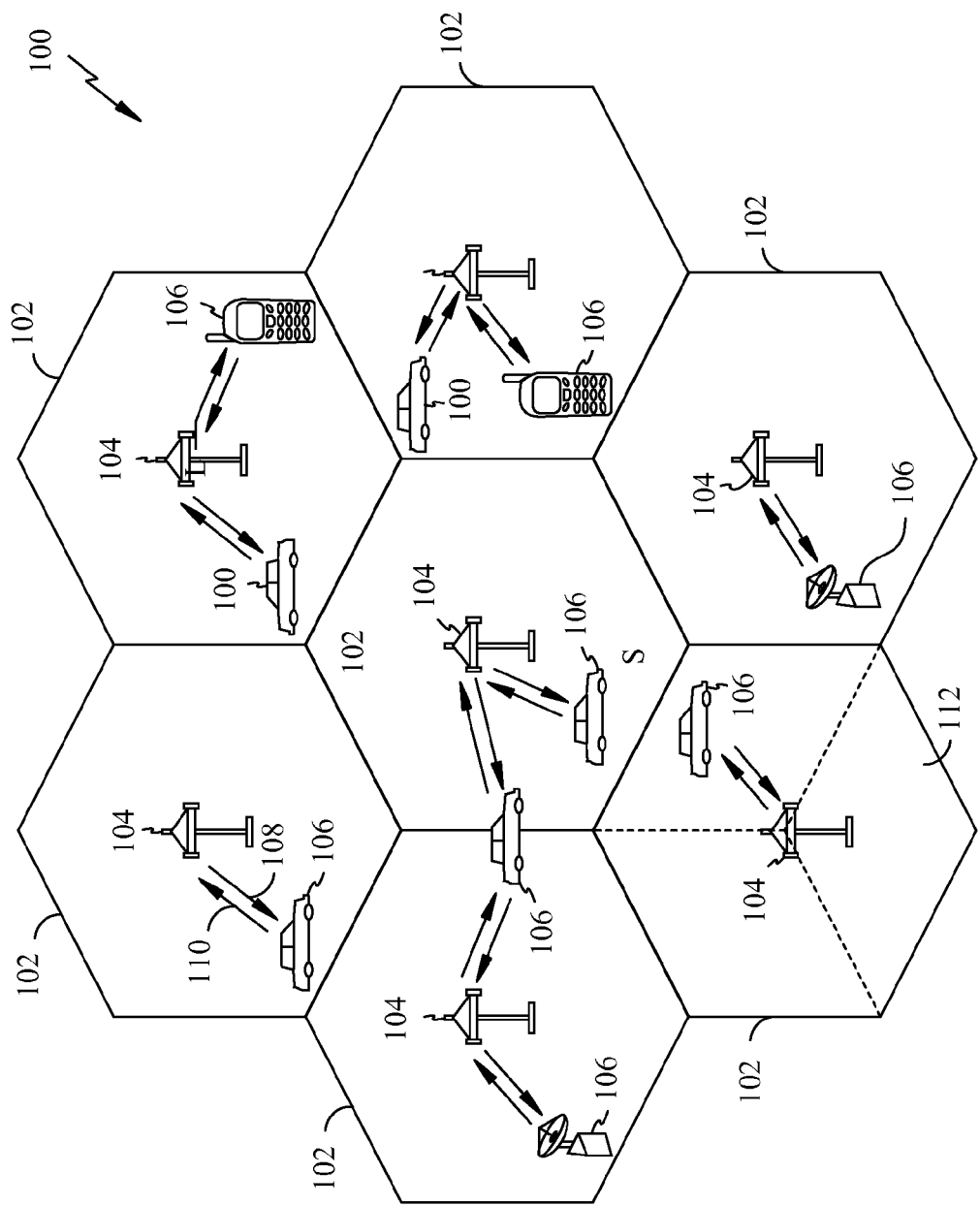
FIG. 1 illustrates an example wireless communication system, in accordance with certain embodiments of the present disclosure.

Certain embodiments of the present disclosure allow security keys to be maintained across mobile device states, or communication events, such as hand-over, and system idle and sleep power savings states. By monitoring the lifetime of security keys, keys may be refreshed in an effort to ensure key lifetimes will not expire during a hand-over process or device unavailable state. As a result, the total duration of breaks in traffic may be reduced by avoiding lengthy renegotiations of security keys.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
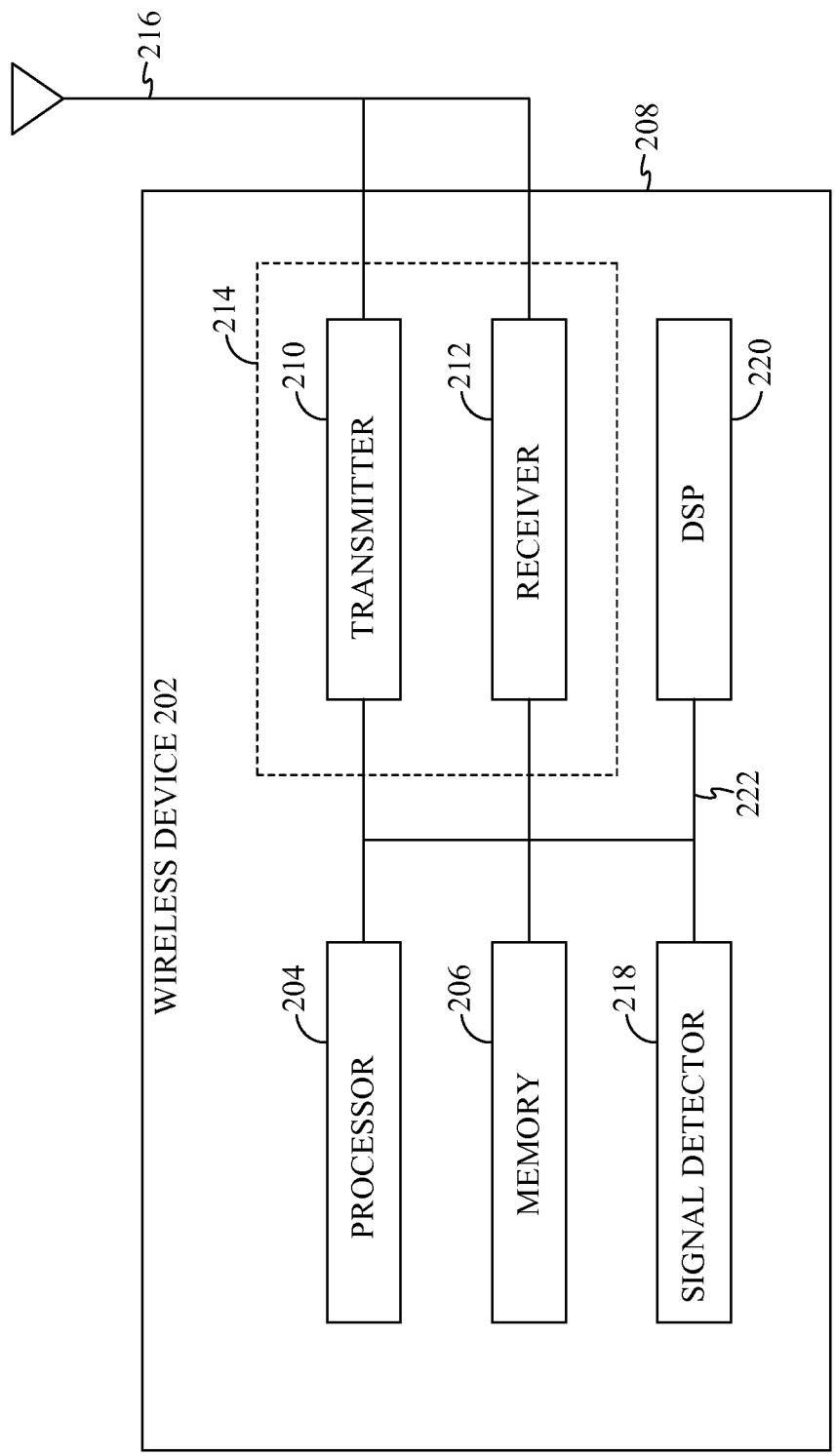
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
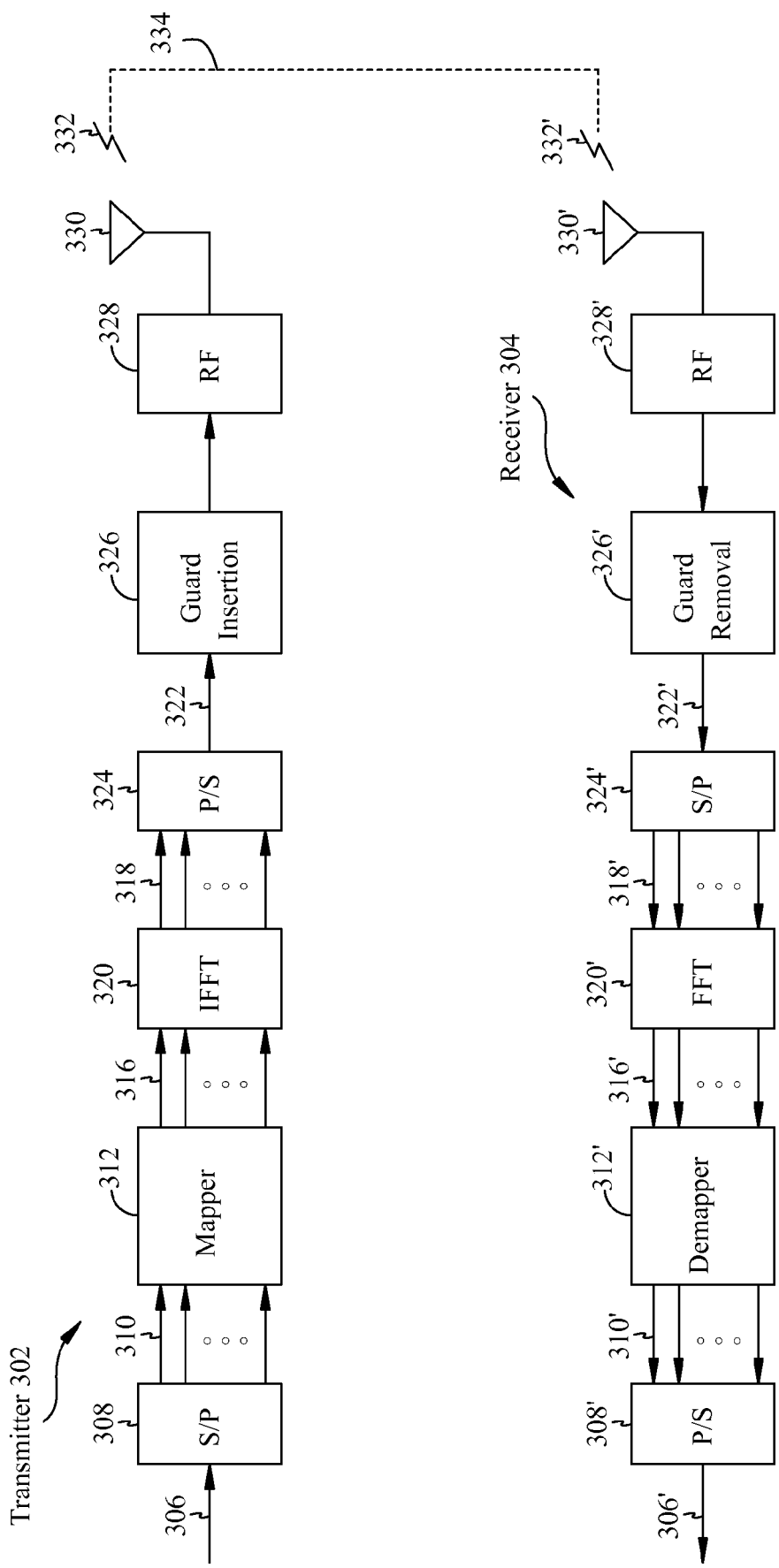
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Maintaining Security Keys Across Base Station Hand-Over

Various techniques for a mobile station to hand-over between base stations are supported in IEEE 802.16e-2005 standard. Hand-over decisions may be made by the BS or the MS, based on measurement results reported by the MS. The MS may periodically conduct an RF scan and measure the signal quality of neighboring base stations. A hand-over decision may be made, for example, based on the signal strength from one cell exceeding the current cell, the MS changing location leading to signal fading or interference, or the MS requiring a higher Quality of Service (QoS). Regardless, once a hand-over decision is made, the MS may begin synchronization with the downlink transmission of the new BS, perform ranging if it was not done while scanning, and terminate the connection with the previous BS.

Pursuant to the WiMAX security protocol, before exchanging data with the new BS after a hand-over, the MS needs to have established valid security keys. Assuming the hand-over procedure is completed before the lifetimes of a previously negotiated set of security keys, data exchange may begin promptly after hand-over. On the other hand, if the lifetime for one or more security keys expires during the hand-over procedure, data exchange with the new BS will be delayed until the MS can negotiate valid security keys with the new BS. Thus, the total break in traffic will be increased by the length of this key negotiation, which may be substantial enough to significantly degrade user experience.

Figure 4:
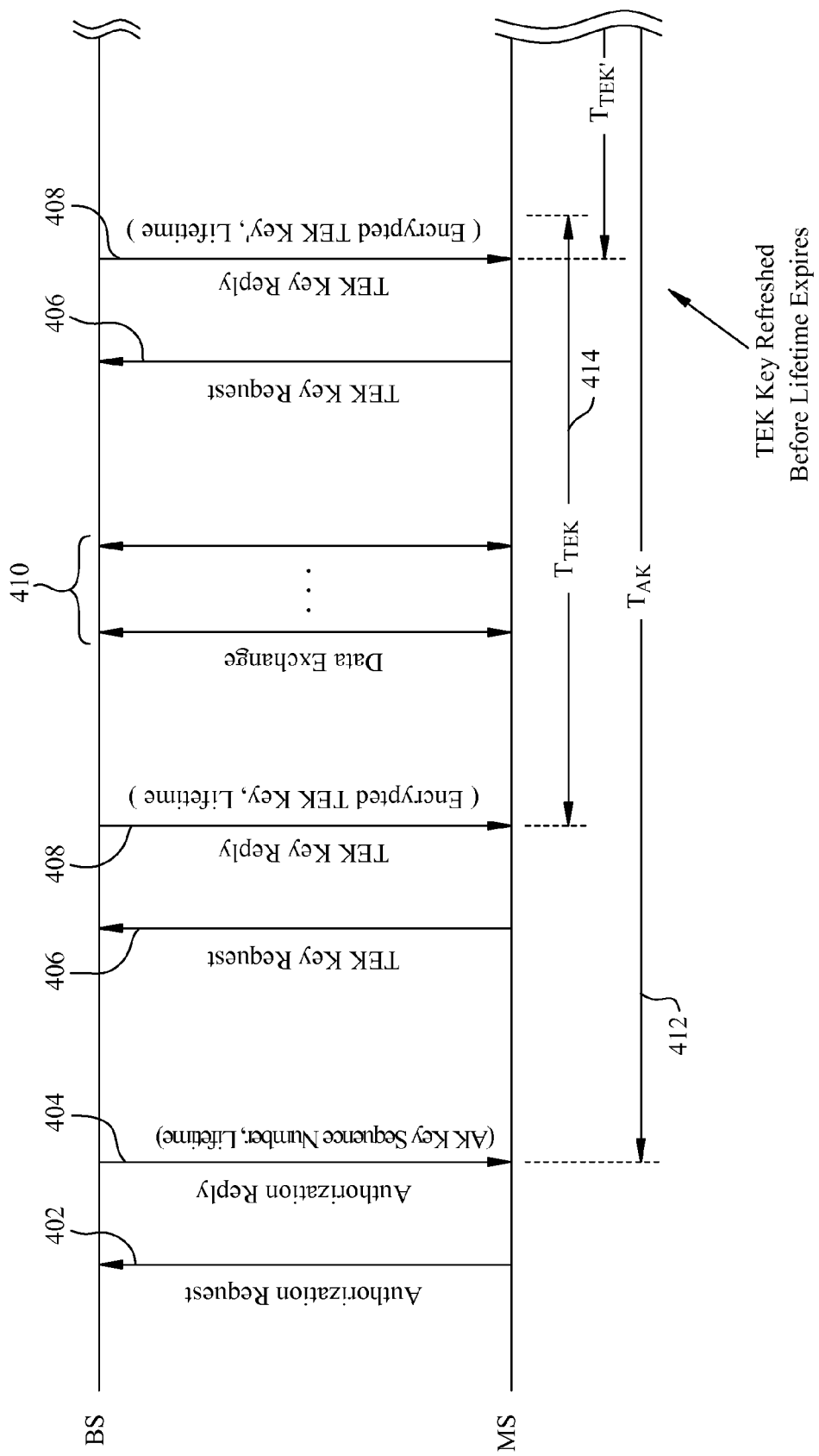
FIG. 4 illustrates example transactions between a mobile station and base station to negotiate security keys, in accordance with embodiments of the present disclosure.

FIG. 4 illustrates example transactions between an MS and BS to negotiate security keys, in accordance with embodiments of the present disclosure. As illustrated, the security protocol may require the BS and MS to establish a set of different type valid security keys, such as AK (authorization key) and TEK (traffic encryption key) keys. These security keys may be used for both management connections, as well as transport connections.

An AK may be negotiated by the MS via an authorization request 402 sent to the BS. In response, the BS may generate an AK and send the corresponding key sequence number and a corresponding lifetime for the AK in an authorization reply 404. In a similar manner, a TEK may be negotiated via a TEK key request 406 sent to the BS. In response, the BS may generate a TEK key and send the TEK and a corresponding lifetime for the TEK key in a TEK key reply 408. After establishing the valid keys, data exchange 410 between the MS and BS may take place.

As illustrated, the different security keys may have different lifetimes ($T_{AK}$ 412 and $T_{TEK}$ 414) and the standards may require the network and mobile station to refresh the keys periodically, depending on the length of their lifetimes. In the event that a security key lifetime expires before the key is refreshed, data exchanges between the MS and BS will be halted until a new security key is successfully negotiated.

Figure 5:
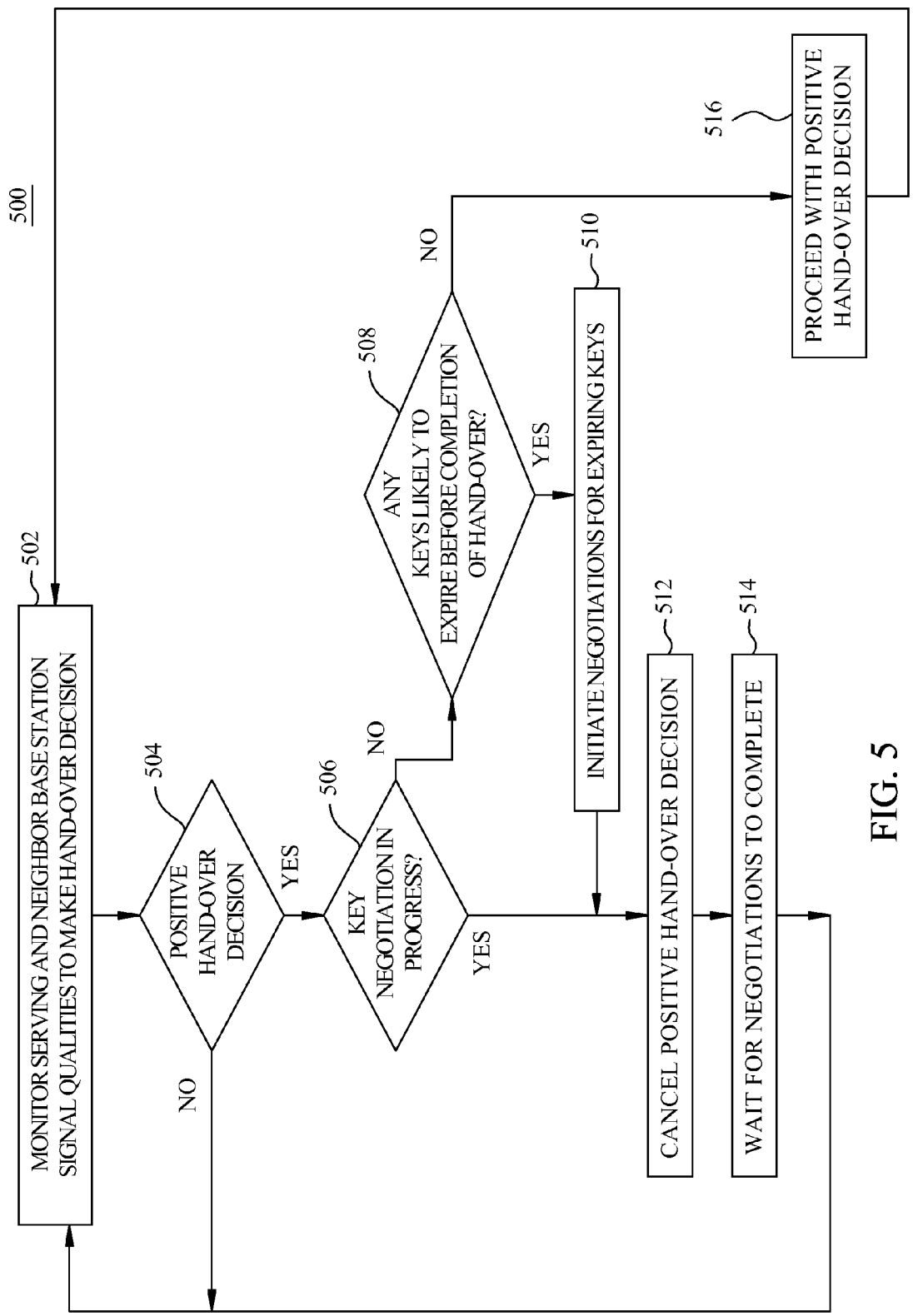
FIG. 5 illustrates example operations for maintaining security keys across a hand-over between base stations, in accordance with embodiments of the present disclosure.

FIG. 5 illustrates example operations 500 that may be performed, at an MS, in an effort to prevent security keys from expiring during a hand-over between base stations, in accordance with embodiments of the present disclosure. The operations 500 begin, at 502, by monitoring serving and neighbor base station signal qualities in order to make a hand-over decision.

Once a positive hand-over decision is made, at 504, the status of security key lifetimes may be checked before actually initiating the hand-over process. The hand-over process may be delayed, if necessary, to ensure valid keys are established and will remain valid after the hand-over process.

For example, if a key negotiation is in progress (with the current serving base station), as determined at 506, the hand-over process may be delayed. The hand-over process may be delayed, for example, by canceling the positive hand-over decision, at 512, and waiting for negotiations to complete, at 514. Waiting until the key negotiations to complete may ensure that security keys with full lifetimes. Thus, if a positive hand-over decision is again made, at 504, the keys should still be valid after the hand-over process.

The key lifetimes may also be examined, at 508, to determine if any keys are likely to expire before completion of the hand-over process. For this determination, remaining key lifetimes may be compared against an expected hand-over time, possibly taking into account worst-case scenario conditions to be conservative. If one or more keys are likely to expire before completion of the handover, the MS may initiate negotiations for the expiring keys, at 510. The MS may again delay the hand-over process by canceling the positive hand-over decision, at 512, and waiting for the negotiations to complete, at 514.

If there are no pending key negotiations (per 506) and no keys that have expired or are likely to expire during hand-over (per 508), the MS may proceed to process the positive hand-over, at 516.

FIGS. 6A and 6B illustrate how delaying the hand-over process in accordance with the operations of FIG. 5 may help reduce overall traffic break time experienced with a hand-over between base stations. Referring first to FIG. 6A, an example diagram of a hand-over process is illustrated that allows security keys to expire during the hand-over.

The example in FIG. 6A assumes that a TEK security key established during normal operations 602 with a first base station (BS-A) has a lifetime $T_{TEK}$ 610 that expires during the hand-over process 604 to a second base station (BS-B). Because valid security keys are required before data transmissions may resume with BS-B, the MS must initiate key negotiations 606 after the hand-over. As a result, the total break in traffic 608$_A$ is extended until beyond the hand-over time the key negotiations are complete.

FIG. 6B, on the other hand, illustrates a "delayed" hand-over process that results in a reduced overall break in traffic 608$_B$. The example in FIG. 6B again assumes that a TEK security key established during normal operations 602 with the first base station (BS-A) has a lifetime $T_{TEK}$ 610 that expires during the hand-over process 604 to a second base station (BS-B).

However, by monitoring the security key lifetimes, the MS may determine that the TEK key lifetime is likely to expire during the hand-over process 604. In response, the MS may delay the hand-over process and initiate key negotiations 606. During key negotiations 606, the expiring TEK key is still valid and, thus, the MS may still exchange traffic with BS-A. Thus, there is no break in traffic during the key negotiations 606.

After completion of the key negotiations 606, the MS will have a new TEK key with a lifetime $T_{TEK'}$ 610' that expires well after the hand-over process 604. As a result, normal operations 602 may commence with data exchange between the MS and BS-B (using the newly negotiated TEK key) without the additional delay of key negotiations after the hand-over process 604. Thus, by delaying the hand-over process in order to refresh a security key set to expire during the hand-over process, the overall break in traffic 608$_B$ of FIG. 6B may be significantly less than the overall break in traffic 608$_A$ of FIG. 6A.

Maintain Security Keys Across Sleep and Idle States

The WiMAX standards define power-saving states that allow portable subscriber stations to extend battery life by powering down certain circuits when an MS is not actively transmitting or receiving data. For example, in a sleep mode, the MS effectively turns itself off during an un-available time for predefined periods of time (referred to as sleep windows) that are negotiated with the serving BS. Between sleep windows the MS wakes up (in listening windows) to monitor for traffic or messages that would cause the MS to exit the low power state.

The sleep window may be fixed or exponentially increasing, depending on a particular Power Savings Class (PSC) the device enters. The PSC type may be determined based on the type of traffic the MS is handling in a particular connection. PSC I is typically used for best-effort (BE) and non-real-time variable rate (NRT-VR) traffic. PSC II has a fixed-length sleep window and is typically used for unsolicited grant service (UGS). PSC III has a one-time sleep window and is typically used for multicast traffic or management traffic when the MS knows when the next traffic is expected.

Unfortunately, security keys can expire during sleep windows, when the MS is un-available in a sleep mode. Much like with the hand-over process described above, if a key expires during the sleep window, a new key has to be negotiated after the MS enters the available interval (listening window). If the user has data to transmit, the transmission of that data will be delayed until a new key is successfully negotiated, thereby negatively affecting overall data throughput. This affects not only traffic from the MS, but also traffic from the network to the MS. Thus, the delay associated with having to negotiate a key after expiration may result in a quality of service (QoS) violation on the particular service flow associated with the expiring key.

However, embodiments of the present disclosure may help prevent these delays by monitoring key expiration time when an MS is in sleep mode. If the MS detects that a key is going to expire in the un-available window in sleep mode, it may decide to terminate the sleep mode early (e.g., before an event that would have caused a natural exit) and negotiate new key with the network.

Figure 7:
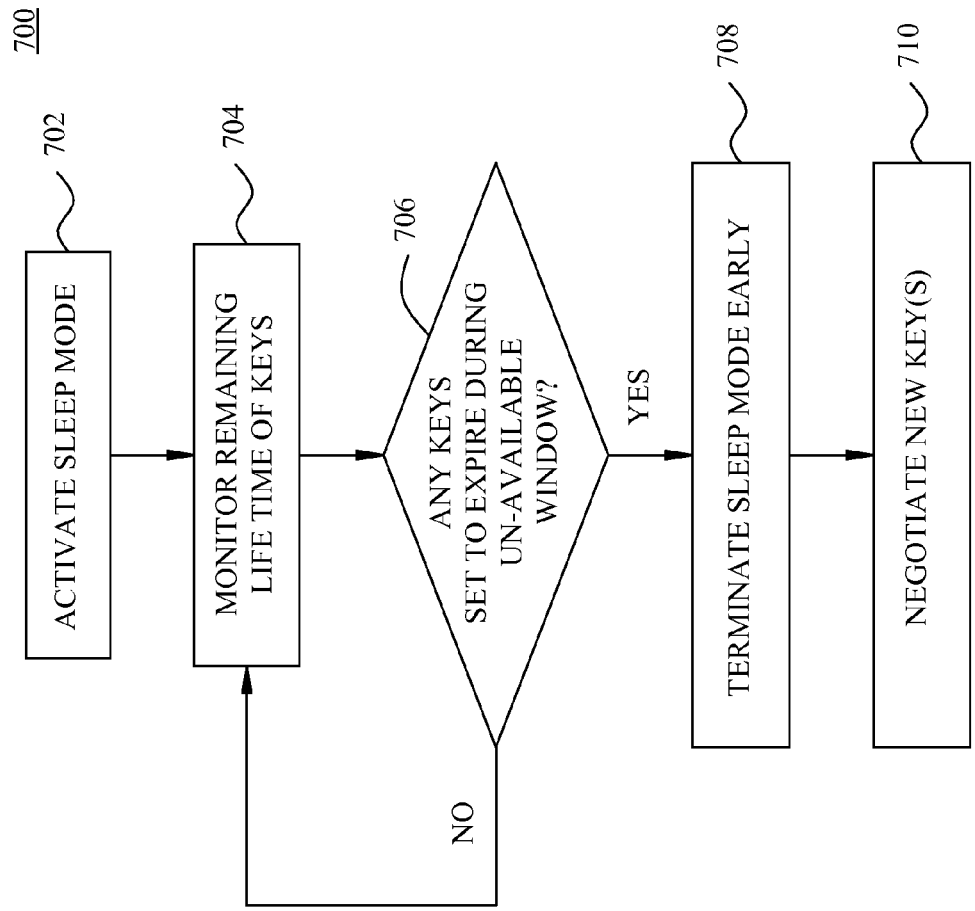
FIG. 7 illustrates example operations for maintaining security keys across unavailable periods in sleep mode, in accordance with embodiments of the present disclosure.
Figure 7A:
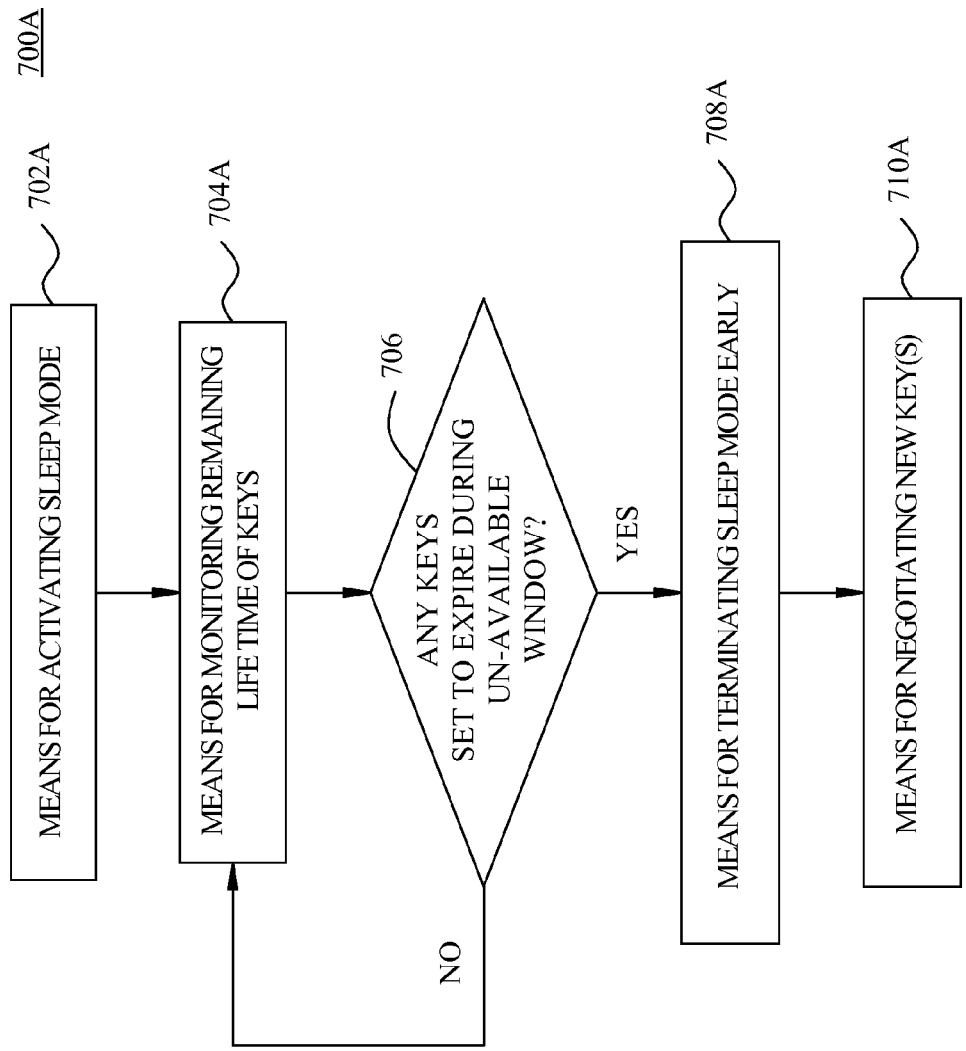
FIG. 7A is a block diagram of components capable of performing the example operations of FIG. 7.

FIG. 7 illustrates example operations 700 for maintaining security keys across unavailable periods in sleep mode, activated at 702. At 704, remaining lifetime of keys is monitored. A determination is made, at 706, whether any keys are set to expire during an un-available period when the MS is in a sleep window. For this determination, remaining key lifetimes may be compared against the expected sleep window, for example, taking into consideration whether the sleep window is fixed or exponentially increasing. If no keys are likely to expire, the device may be allowed to enter the sleep window and remain in the sleep mode.

On the other hand, if one or more keys are set to expire during a sleep window, the MS may terminate the sleep mode early, at 708, and negotiate a new key (or keys), at 710. Exiting the sleep mode early to refresh the expiring keys may help avoid lengthy key renegotiations that might interrupt data traffic. After the key negotiations are complete and the expiring key(s) have been refreshed, the MS may activate the sleep mode, again.

Although optional for current versions of WiMAX standards, idle mode may provide even greater power savings with components of the MS turned off, while the MS is un-registered while still receiving DL broadcast traffic. The MS periodically wakes up to check for paging messages and to update its paging group.

Unfortunately, security keys may expire during the power saving state in idle mode. If a key does expire, when a user starts to make a connection (e.g., a voice call), the connection will be delayed until after a new key is successfully negotiated. As a result, the connection set-up time is extended, which may have a negative impact on user experience.

Figure 8:
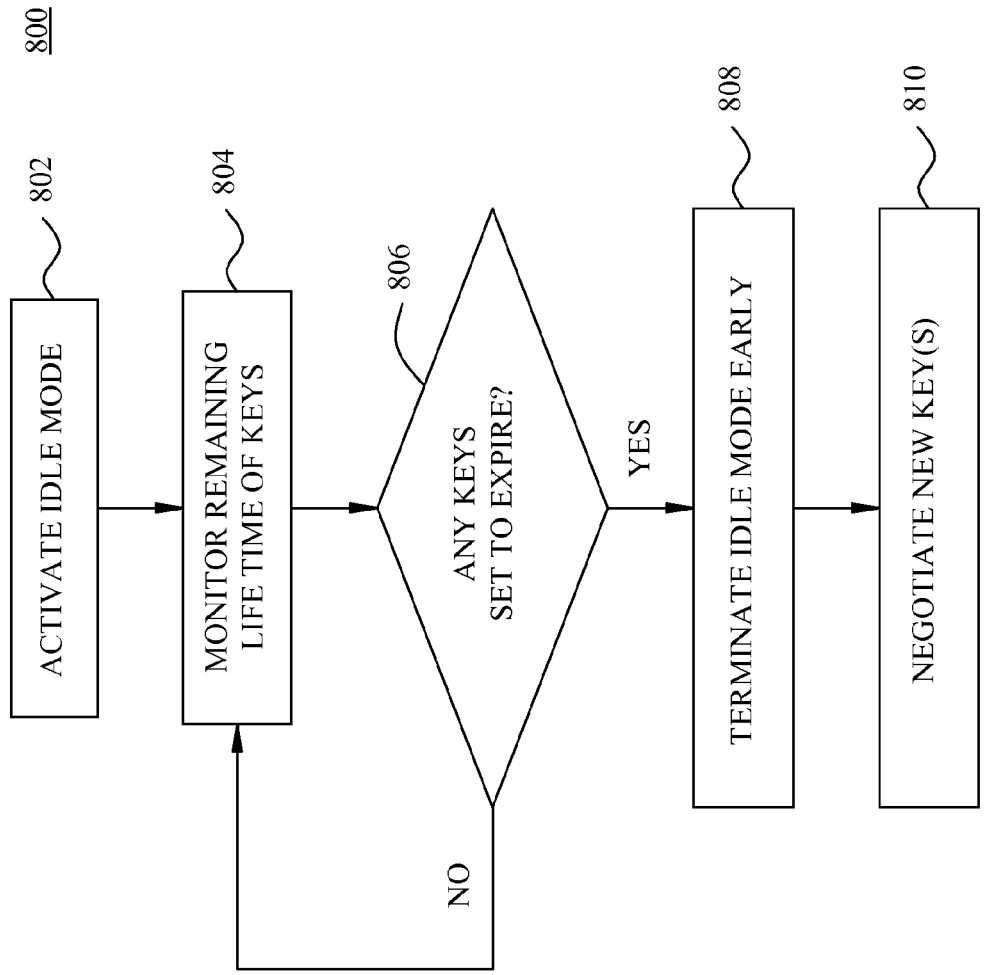
FIG. 8 illustrates example operations for maintaining security keys across unavailable periods in idle mode, in accordance with embodiments of the present disclosure.
Figure 8A:
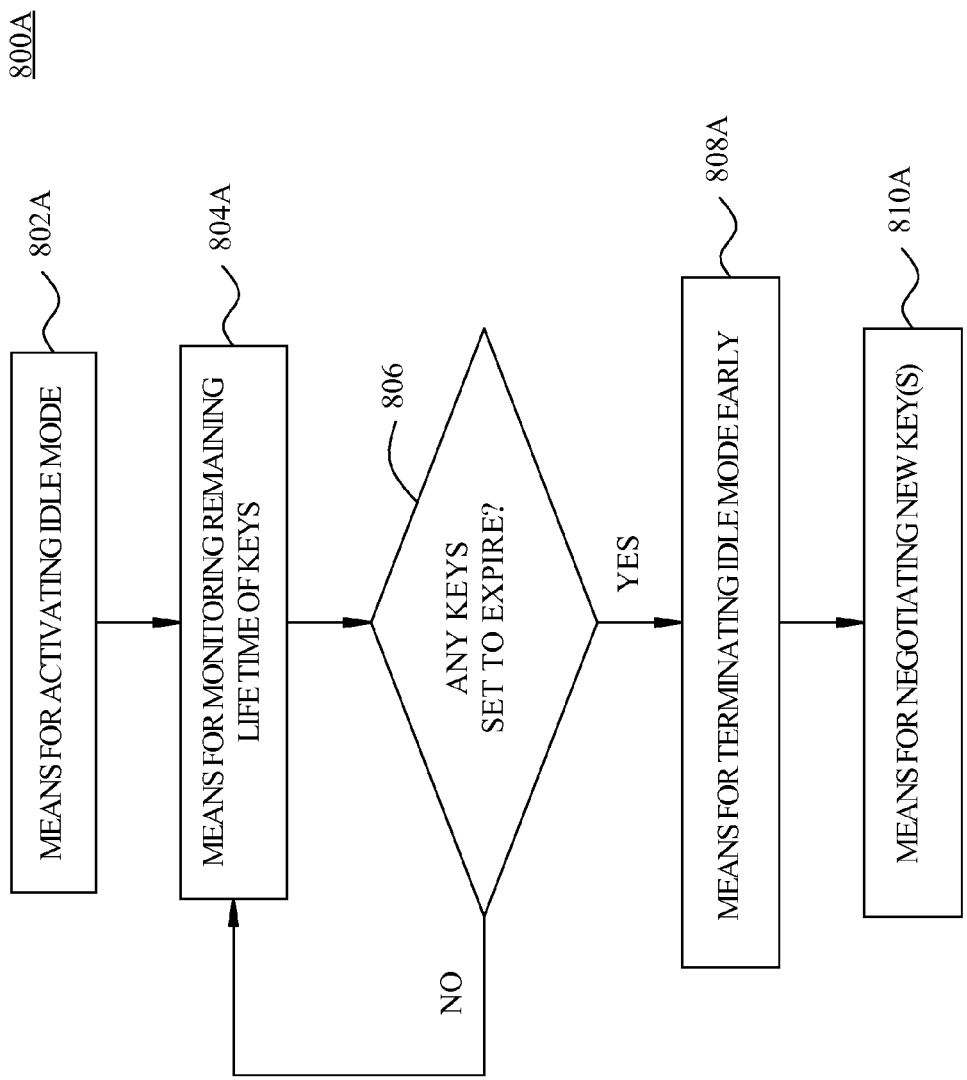
FIG. 8A is a block diagram of components capable of performing the example operations of FIG. 8.

FIG. 8 illustrates example operations 800 for maintaining security keys across low power states in idle mode, activated at 802. At 804, remaining lifetime of keys is monitored. A determination is made, at 806, whether any keys are set to expire when the MS is in a low power state of the idle mode. For this determination, remaining key lifetimes may be compared against the expected duration of the low power state.

If one or more keys are set to expire, the MS may terminate the idle mode early, at 808, and negotiate a new key (or keys), at 810. Exiting the idle mode early to refresh the expiring keys may help avoid a lengthy key negotiation that may result in a delay in call setup. After the key negotiations are complete and the expiring key(s) have been refreshed, the MS may enter the IDLE mode, again.

Figure 5A:
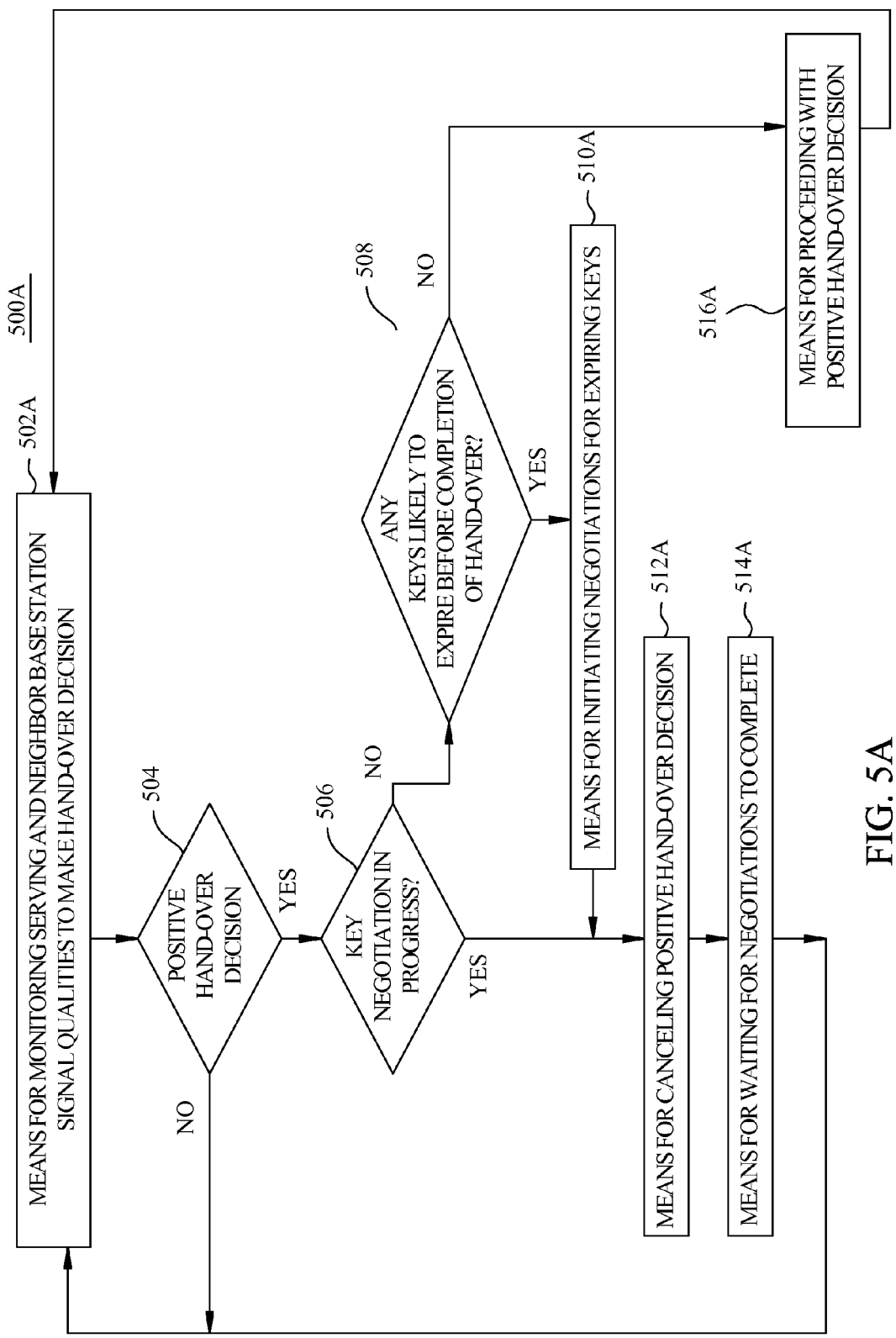
FIG. 5A is a block diagram of components capable of performing the example operations of FIG. 5.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 502-516 illustrated in FIG. 5 correspond to means-plus-function blocks 502A-516A illustrated in FIG. 5A.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as instructions or as one or more sets of instructions on a computer-readable medium or storage medium. A storage media may be any available media that can be accessed by a computer or one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for maintaining one or more security keys used by a wireless device for wireless communication, comprising:
   determining, at the wireless device, when a communication event should occur, wherein the communication event comprises the wireless device being in a low power state in a power savings mode;
   monitoring the lifetime of the one or more security keys;
   identifying whether at least one security key is set to expire during the communication event by comparing a remaining lifetime of the at least one security key to a period of the low power state of the power savings mode;
   delaying the communication event if the at least one security key is identified as set to expire during the communication event; and
   refreshing the at least one security key identified as set to expire during the communication event.

2. The method of claim 1, further comprising:
   repeating the steps of determining, monitoring, delaying, and refreshing until no security key is identified as set to expire during the communication event; and
   initiating the communication event.

3. The method of claim 1, wherein the power savings mode includes a sleep mode.

4. The method of claim 1, wherein the power savings mode includes an idle mode.

5. The method of claim 1, wherein the wireless device communicates using frames in accordance with one or more standards of the Institute of Electrical and Electronics Engineers (IEEE) 802.16 family of standards.

6. An apparatus configured to maintain one or more security keys used by a wireless device for wireless communication, comprising:
   logic for determining when a communication event should occur, wherein the communication event comprises the wireless device being in a low power state of a power savings mode;
   logic for monitoring the lifetime of the one or more security keys;
   logic for identifying whether at least one security key is set to expire during the communication event by comparing a remaining lifetime of the at least one security key to a period of the low power state of the power savings mode;
   logic for delaying the communication event if the at least one security key is identified as set to expire during the communication event; and
   logic for refreshing the at least one security key identified as set to expire during the communication event.

7. The apparatus of claim 6, further comprising:
   logic for repeating the determining, monitoring, delaying, and refreshing until no security key is identified as set to expire during the communication event; and
   logic for initiating the communication event.

8. The apparatus of claim 6, wherein the power savings mode includes a sleep mode.

9. The apparatus of claim 6, wherein the power savings mode includes an idle mode.

10. The apparatus of claim 6, wherein the apparatus includes logic for communicating using frames in accordance with one or more standards of the Institute of Electrical and Electronics Engineers (IEEE) 802.16 family of standards.

11. An apparatus for maintaining one or more security keys used by a wireless device for wireless communication, comprising:
    means for determining when a communication event should occur, wherein the communication event comprises the wireless device being in a low power state of a power savings mode;
    means for monitoring the lifetime of the one or more security keys;
    means for identifying whether at least one security key is set to expire during the communication event by comparing a remaining lifetime of the at least one security key to a period of the low power state of the power savings mode;
    means for delaying the communication event if the at least one security key is identified as set to expire during the communication event; and
    means for refreshing the at least one security key identified as set to expire during the communication event.

12. The apparatus of claim 11, further comprising:
means for repeating the determining, monitoring, delaying, and refreshing until no security key is identified as set to expire during the communication event; and
means for initiating the communication event.

13. The apparatus of claim 11, wherein the power savings mode includes a sleep mode.

14. The apparatus of claim 11, wherein the power savings mode includes an idle mode.

15. The apparatus of claim 11, wherein the apparatus includes means for communicating using frames in accordance with one or more standards of the Institute of Electrical and Electronics Engineers (IEEE) 802.16 family of standards.

16. A computer-program product for maintaining one or more security keys used by a wireless device for wireless communication comprising a non-transitory computer readable medium having a set of instructions stored thereon, the set of instructions being executable by one or more processors and the set of instructions comprising:
instructions for determining when a communication event should occur, wherein the communication event comprises the wireless device being in a low power state of a power savings mode;
instructions for monitoring the lifetime of the one or more security keys;
instructions for identifying whether at least one security key is set to expire during the communication event by comparing a remaining lifetime of the at least one security key to a period of the low power state of the power savings mode;
instructions for delaying the communication event if the at least one security key is identified as set to expire during the communication event; and
instructions for refreshing the at least one security key identified as set to expire during the communication event.

17. The computer-program product of claim 16, the set of instructions further comprising:
instructions for repeating the determining, monitoring, delaying, and refreshing until no security key is identified as set to expire during the communication event; and
instructions for initiating the communication event.

18. The computer-program product of claim 16, wherein the power savings mode includes a sleep mode.

19. The computer-program product of claim 16, wherein the power savings mode includes an idle mode.

20. The computer-program product of claim 16, wherein the set of instructions includes instructions for communicating using frames in accordance with one or more standards of the Institute of Electrical and Electronics Engineers (IEEE) 802.16 family of standards.

* * * * *